No. 761,540. PATENTED MAY 31, 1904.
W. G. PRICE.
MOTOR SUSPENSION.
APPLICATION FILED NOV. 19, 1903.
NO MODEL. 3 SHEETS—SHEET 3.
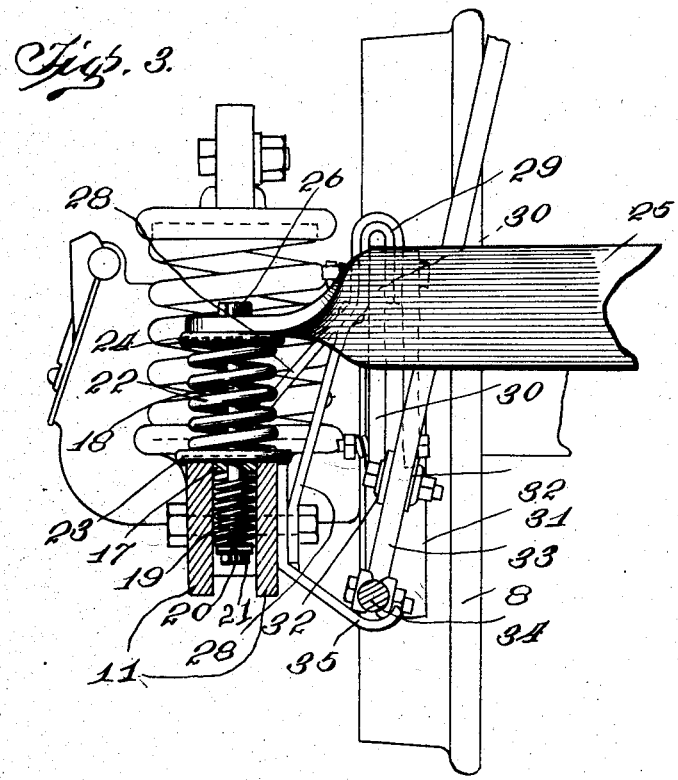
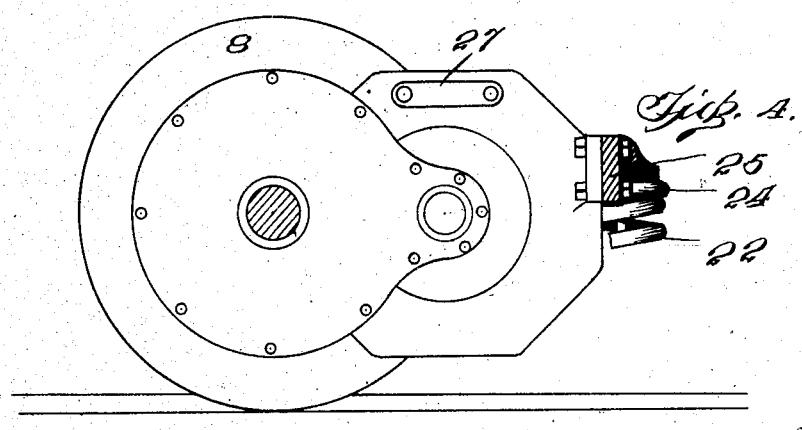
Witnesses
L. Ginford Hands
Edgar M. Kitchin
Inventor
William G. Price
By Mason Fenwick & Lawrence
Attorneys No. 761,540. Patented May 31, 1904.

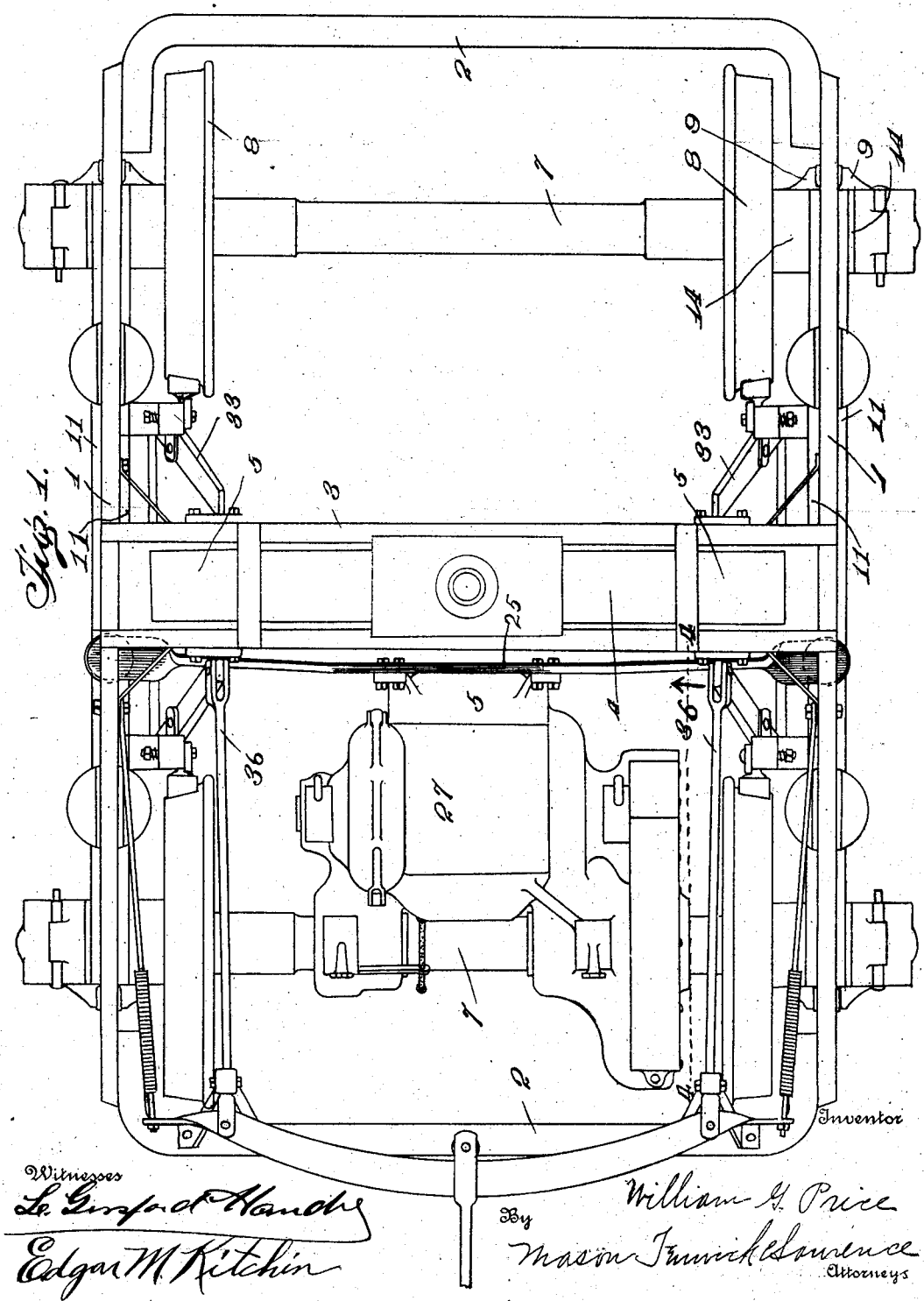

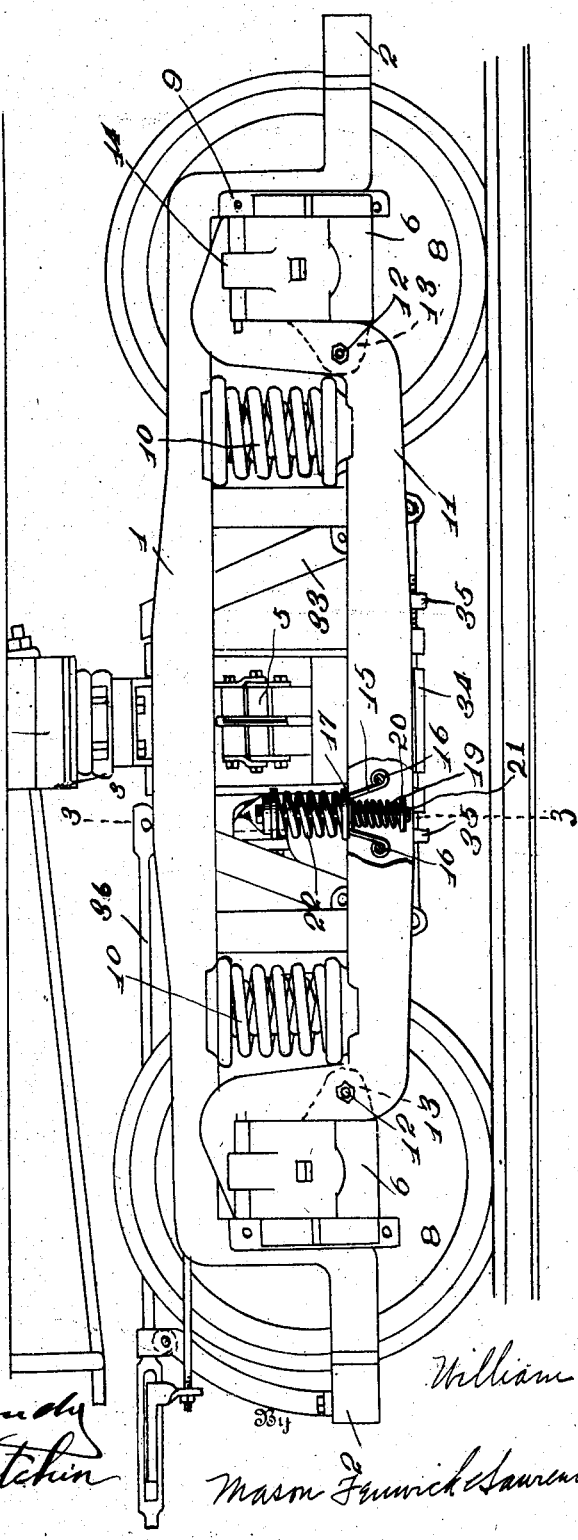

UNITED STATES PATENT OFFICE.

WILLIAM G. PRICE, OF KINGSTON, NEW YORK.

MOTOR SUSPENSION.

SPECIFICATION forming part of Letters Patent No. 761,540, dated May 31, 1904.

Application filed November 19, 1903. Serial No. 181,882. (No model.)

*To all whom it may concern:*

Be it known that I, WILLIAM G. PRICE, a citizen of the United States, residing at Kingston, in the county of Ulster and State of New York, have invented certain new and useful Improvements in Motor Suspensions; and I do hereby declare the following to be a full, clear, and exact description of the invention, such as will enable others skilled in the art to which it appertains to make and use the same.

This invention relates to improvements in car-trucks, and has particular reference to motor-supporting means therefor.

The object of the invention is the provision of a motor-support which shall prevent the transmission of vibration from the motor to the car-body carried by a truck, and this object is attained by the provision of means in combination with a truck for supporting a motor independently of the same.

In carrying out this invention I contemplate providing, in combination with a car-truck and equalizer-bars therefor, motor-supporting means carried by said bars.

The invention consists in certain novel constructions, combinations, and arrangements of parts, as will be hereinafter fully described and claimed.

In the accompanying drawings, Figure 1 represents a top plan view of a car-truck provided with an embodiment of the present improved motor-support. Fig. 2 represents a view in side elevation of the same. Fig. 3 represents an enlarged detail fragmentary transverse vertical section taken on the plane of line 3 3 of Fig. 2. Fig. 4 represents a transverse vertical section taken on the plane of line 4 4 of Fig. 1 and looking in the direction indicated by the arrow.

In the present art it is well known that serious objections to the common form of mounting of motors arises from the fact that vibrations from the gear are felt within the car supported upon a truck carrying a given motor. The motors are usually carried between the axle of a truck and one of its transoms, suitable springs being interposed between the transoms and the carrying-bolster; but these springs have proven insufficient for absorbing all of the vibration, and I have therefore conceived of the mounting of the motor practically independently of the truck, whereby the vibration will not only fail to affect the car, but will not to any material degree affect the car-truck, and this arrangement in its preferred embodiment is delineated in the accompanying drawings, in which 1 1 indicate the side frames of a truck, connected at their ends by end frames 2 2. The side frames 1 are connected by suitable transoms 3 3, spaced apart and supporting therebetween a car-body-carrying bolster 4, mounted upon springs 5 5, carried by said transoms. Each side frame 1 is bent into yoke shape and formed with a pedestal at each end extending just outside of and contacting with the side wall of its respective box 6 6, inclosing the end of the corresponding axle 7, said axle carrying supporting-wheels 8 8. Each bearing-box 6 is provided with laterally-projecting flanges 9 9, inclosing the respective pedestal and limiting the given side frame against lateral play. Each side frame 1 is supported upon cushions or springs 10 10, positioned beneath a given side frame and resting upon an equalizer-bar 11, said bar extending between and connecting the two boxes 6 at one side of the truck, said bar preferably consisting of a plurality of beams spaced apart, as best seen in Fig. 3, and secured together and to the boxes 6 by bolts 12 12, extending through said beams and through lugs 13 13, projecting laterally from the boxes. Each bar 11 is spaced below its corresponding frame 1 and is bent about the boxes 6 at its ends, with the end portions of the respective beams lying upon the upper surface of the given boxes spaced apart outside the plane of the vertical face of the corresponding frame 1 for permitting said frame to move between the said ends of the beams and be limited thereby against lateral movement. The said ends of the beams are retained against movement by vertically-projecting lugs 14 14, extending upwardly from the boxes upon the opposite sides of said beams.

Each of the equalizer-bars 11 carries at each end brackets 28 28, bolted thereto and extending above and inclined inwardly therefrom. Each set of said brackets 28 is at its upper end bent into a hook 29, between the members of which is pivotally secured a link 30. The lower end of each link 30 pivotally engages the web of a brake-shoe 31 for supporting the same in position for engaging one of the wheels 8. Suitable links 32 32 connect with the web of each of said shoes 31 and at their outer ends engage an operating-lever 33, the levers at one side of the frame being connected together by a turnbuckle 34. A bracket 35 depends from each equalizer-bar near each end of the respective turnbuckle 34 and extends beneath the same for supporting said turnbuckle in case of accidental displacement of the parts and dropping of said turnbuckle. One of the levers 33 at each side of the truck is preferably left with its upper end free to contact with one of the transoms 3, while the other lever is engaged by a draw-rod 36, said draw-rod being connected to any suitable draft mechanism.

I have above briefly outlined the general construction of the present improved truck and mentioned elements which are fully covered in the specification and claims of other applications filed by me and which do not constitute the subject-matter for claim in the present application.

The subject-matter for claim in the present application is the motor-supporting means, which I shall now proceed to describe, the preceding description being given in order that the claimed structure shall be clearly understood by those skilled in the art.

Between the beams comprising each equalizer-bar 11 is arranged a bracket 15, said bracket being secured by suitable bolts 16 16 and being provided with a flattened apertured portion 17. A vertical longitudinally-movable bolt 18 extends through the aperture of said flattened portion of the bracket and is surrounded beneath said bracket by a comparatively small spring or other suitable cushion 19, retained in position by a washer or bushing 20, carried by said bolt and supported by a nut 21, threaded onto the same. Above the flattened portion of the bracket is arranged a relatively large spring or other cushion 22, surrounding bolt 18 and supported upon a cap 23, resting upon the respective bar 11. The upper end of the spring or cushion 22 supports a cap 24, which in turn carries the end of a bar 25, said end of the bar being apertured and the bolt 18 being passed therethrough and retained in position by a suitable nut 26. The bar 25 extends across the entire truck with its flat faces lying in vertical planes; but the ends of said bar are preferably twisted, as indicated in the drawings, so as to lie flat upon the caps 24.

In operation a motor 27 is suspended from the bar 25 and geared to one of the axles 7 for driving the same in the usual manner. A plurality of motors may be supported in a similar manner, and it will be seen that vibrations of the motor will be absorbed by the cushions 19 and 22, and whatever vibration might not be taken up thereby will tend simply to affect the bars 11 and the axles of the car-supporting wheels. It will be seen that the motor may be supported practically independently of the car-truck frame and the object sought thus effectually attained.

Among the many advantages obtained by the present improved structure may be mentioned the fact that the supporting of the brake-rigging, as well as the motor, directly from the equalizer-bars and independently of the truck-frame makes possible the removal of the truck-frame independently of such brake-rigging and motor, and thereby enables access to be had to the motor without disturbing the motor, wheels and axles, and brake-rigging for permitting cleaning and repairing of the parts.

Having thus fully described my invention, what I claim as new, and desire to secure by Letters Patent, is—

1. In a mechanism of the class described, the combination with a car-truck and a divided equalizer-bar, of a spring interposed between the parts of said bar, means connecting said spring to said bar, and motor-supporting means connected with said spring.

2. In a mechanism of the class described, the combination with a car-truck and axles therefor, of divided equalizer-bars connecting said axles, a bracket arranged between the parts of each of said bars, a bolt extending through each of said brackets, a spring arranged above the horizontal plane of the lower edge of each of said brackets between the parts thereof engaging said bolt at one end and engaging said bracket at the other, a spring mounted upon each of said bars above the respective bracket surrounding its corresponding bolt, and motor-supporting means engaged by said bolts and supported by said last-mentioned springs.

3. In a mechanism of the class described, the combination with a truck and a divided equalizer-bar therefor, of a cushion interposed between the parts of said bar and carried by the bar, and motor-supporting means connected with said cushion.

4. In a mechanism of the class described, the combination with a car-truck and a divided equalizer-bar therefor, of a cushion interposed between the parts of said bar, a motor-support carried by said equalizer-bar, and connections between said motor-support and cushion.

5. In a mechanism of the class described, the combination with a car-truck and an equalizer-bar therefor, composed of a plurality of plates, of a spring positioned between said plates, means engaging said bar preventing the upward movement of said spring, a motor-support and means engaging said spring for cushioning the upward movement of said support.

6. In a mechanism of the class described, the combination with a car-truck and a divided equalizer-bar therefor, of a cushion resting upon said bars, a motor-support resting upon said cushion, a cushion between the parts of said bar, and connections between said motor-support and said last-mentioned cushion.

7. In a mechanism of the class described, the combination with a car-truck and an equalizer-bar therefor, of a motor-support, a spring arranged between the horizontal plane of the lower edge of said bar and the horizontal plane of the upper edge thereof, and connections between said motor-support and spring.

8. In a mechanism of the class described, the combination with a car-truck and a divided equalizer-bar therefor, of a motor-support, and a pair of motor-suspension springs carrying said support, one of said springs being relatively small and located entirely between the parts of the said divided equalizer-bar and the other of said springs being relatively large and disposed entirely above said equalizer-bar.

9. In a mechanism of the class described, the combination with a car-truck and a divided equalizer-bar therefor, of a bracket carried between the parts of said bar and extending upwardly therebetween, a spring arranged within said bracket above the lower edge of said bar, and motor-carrying means engaging said spring.

In testimony whereof I hereunto affix my signature in presence of two witnesses.

WILLIAM G. PRICE.

Witnesses:
EMELINE RUTTER,
AMELIA M. KOUSTANZER.